United States Patent [19]

Cogliano

[11] 4,258,137

[45] Mar. 24, 1981

[54] RIGIDIZED OPEN CELL POLYURETHANE FOAM

[75] Inventor: Joseph A. Cogliano, Pasadena, Md.

[73] Assignee: W. R. Grace & Co., New York, N.Y.

[21] Appl. No.: 83,923

[22] Filed: Oct. 11, 1979

[51] Int. Cl.$^3$ .................... C08G 18/14; C08G 18/38; C08G 18/82

[52] U.S. Cl. .................... 521/55; 521/53; 521/137; 521/156; 260/DIG. 40

[58] Field of Search .................... 521/55, 137, 156; 260/DIG. 40

[56] References Cited

U.S. PATENT DOCUMENTS

| | | | |
|---|---|---|---|
| 2,444,333 | 6/1948 | Castan | 528/95 |
| 3,145,438 | 8/1964 | Kottke et al. | 260/DIG. 40 |
| 3,242,108 | 3/1966 | McGary et al. | 521/156 |
| 3,620,987 | 11/1971 | McLaughlin et al. | 521/156 |
| 3,673,128 | 6/1972 | Hayash et al. | 521/156 |
| 3,676,380 | 7/1972 | McLaughlin et al. | 521/156 |
| 3,781,229 | 12/1973 | Smith et al. | 521/156 |
| 4,137,200 | 1/1979 | Wood et al. | 521/159 |

OTHER PUBLICATIONS

Frisch, Rubber Chemistry & Technology, Sep. 1972, vol. 45, No. 5, pp. 1442, 1460, 1461.

*Primary Examiner*—H. S. Cockeram
*Attorney, Agent, or Firm*—Richard P. Plunkett; William W. McDowell, Jr.

[57] ABSTRACT

This invention relates to the preparation of a flexible, open cell polyurethane foam which can be rigidized by incorporating an epoxy resin into the mixture prior to foaming and, after forming a flexible foam, adding an epoxy curing agent thereto to cause the epoxy resin to cure thereby rigidizing the previously flexible foam. The flexible foam can be reshaped prior to rigidizing if desired.

6 Claims, No Drawings

RIGIDIZED OPEN CELL POLYURETHANE FOAM

BACKGROUND OF THE INVENTION

1. Field of the Invention

This invention pertains to the field of rigid, open cell polyurethane foams. More particularly, this invention relates to the use of an epoxy resin to rigidize open cell flexible foam.

2. Description of the Prior Art

Presently, there are three well known methods for forming polyurethane foams. The most widely used method commercially is the "one shot method". Therein the various foam components, polyisocyanate, polyol, catalyst, blowing agent and water are mixed simultaneously which after a sufficient time depending on the reactants results in a flexible, open cell foam or a rigid, closed cell foam. See, for example, U.S. Pat. No. 4,092,276.

Another method is the prepolymer method which involves the reaction of a polyether or polyester with a diisocyanate prior to foaming employing generally an excess of isocyanate to yield an isocyanate-terminated polymer called a prepolymer. Foaming occurs by reaction of the prepolymer with water with formation of urea linkages and evolution of carbon dioxide which acts as a blowing agent. Initially, in the prepolymer process the amount of water added to the system was limited to the stoichiometric amount required to react with the free isocyanate groups on the prepolymer. These reactions also resulted in either a flexible, open cell or a rigid, closed cell foam. See Canadian Patent No's 575,494 and 575,495.

A more recent method of forming polyurethane foams is the prepolymer method set out in U.S. Pat. No. 4,137,200. Therein the prepolymer is formed from a polyol having an ethylene oxide content of at least 40 mole percent and a polyisocyanate, which prepolymer is subsequently reacted with water in an amount far in excess of that required to react with the free isocyanate groups on the prepolymer.

Polyurethane foams can be compressed and subjected to high temperatures for long periods of time to cause a foam to take on the compressed configuration. Such a process may be accomplished while the foam is curing, U.S. Pat. No. 3,012,282, after the foam has been cured, U.S. Pat. No. 3,050,432, or after the foam has been cured and impregnated with polymeric materials, U.S. Pat. No. 3,400,196. However, in all cases the foam fails to maintain its dimensional stability uniformly and after various periods partially reverts to its original dimensions.

In the field of filtration there is a long felt want for an open cell polyurethane foam filter which will maintain its dimensional integrity. This is one object of the instant invention. Another object is to provide an open cell rigidized foam which will maintain its dimensional stability under relatively high pressures of fluid flow. Another object is the formation of a rigidizable polyurethane foam having good sound absorption properties. These and other objects are attained herein as will be obvious from the following description and examples.

SUMMARY OF THE INVENTION

The present invention relates to the use of an epoxy resin in a composition for forming an open cell polyurethane foam by either the one shot method or the prepolymer method. After foaming and reshaping, if desired, the epoxy is reacted by the addition of an epoxy curing agent, thereby rigidizing the previously flexible, open cell foam.

DESCRIPTION OF THE PREFERRED EMBODIMENTS

This invention pertains to polyurethane foams that are open cell and rigid as considered by those skilled in the foam art. Such foams can be made by either the one shot or prepolymer method. In the one shot method, which is the most widely accepted commercially, an organic isocyanate, preferably an aromatic diisocyanate is reacted with a compound containing an active hydrogen, preferably a polyether polyol, together with other ingredients such as water, auxiliary blowing agents, catalyst and surface active agents.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorous-containing acids, polyacetals, aliphatic polyols, aliphatic thiols including alkane, alkene and alkyne thiols having two or more —SH groups; diamines including both aromatic aliphatic and heterocyclic diamines as well as mixtures thereof. Compounds which contain two or more different groups within the above defined classes may also be used in accordance with the process of the present invention such as, for example, amino alcohols which contain an amino group and a hydroxyl group. Also, compounds may be used which contain one —SH group and one —OH group as well as those which contain an amino group and an —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid α,β-diethylsuccinic acid, isophthalic acid, terephthalic acid, hemimellitic acid and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexandiol, 1,7-heptanediol, glycerol, 1,1,1-trimethylolpropane, 1,1,1-trimethylolethane, hexane-1,2,6-triol, α-methyl glucoside, pentaerythritol and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such a ethanolamine with the polycarboxylic acids set forth above or they may be made using the same components that make up the hydroxy-terminated polyester with only a portion of the components being a diamine such as ethylenediamine.

Alkylene oxide adducts of acids of phosphorus which may be used include those neutral adducts prepared from the alkylene oxides disclosed hereinafter for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed hereinafter.

Any suitable aliphatic thiol including alkane thiols containing at least two —SH groups may be used such as 1,2-ethanedithiol, 1,2-propanedithiol, 1,3-propanedithiol and 1,6-hexanedithiol; alkenethiols such as 2-butene-1,4-dithiol and alkyenethiols such as 3-hexyne-1,6-dithiol.

Any suitable polyamine may be used including aromatic polyamines such as methylene dianiline, polyarylpolyalkylene polyamine(crude methylene dianiline), p-aminoaniline, 1,5-diaminonaphthalene and 2,4-diaminotoluene; aliphatic polyamines such as ethylenediamine, 1,3-propylenediamine; 1,4-butylenediamine and 1,3-butylenediamine as well as substituted secondary derivatives thereof.

In addition to the above hydroxyl-containing compounds useful for forming polyurethane foams, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C. The reactive polyol medium generally has a molecular weight of at least about 500 and a hydroxyl number ranging from about 30 to about 600. The graft polyol has a molecular weight of at least about 1,500 and a viscosity of less than 40,000 cps at 10% polymer concentration.

A more comprehensive discussion of the graft polyols and their method of preparation can be found in U.S. Pat. No's 3,383,351; 3,304,273; 3,652,639 and 3,823,201, the disclosures of which are incorporated herein by reference. Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. No's 3,585,185; 3,639,541 and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred compounds are those having an equivalent weight between 100 and 1,500.

Polyetherpolyols are now well known in the art and are generally prepared by reacting a polyhydric alcohol and an alkylene oxide in the presence of a catalyst. Suitable polyhydric alcohols include ethylene glycol, pentaerythritol, methyl glucoside, propylene glycol, 2,3-butylene glycol, 1,3-butylene glycol, 1,5-pentanediol, 1,6-hexanediol, glycerol, trimethylolpropane, sorbitol, sucrose and mixtures thereof. Suitable alkylene oxides include ethylene oxide, propylene oxide, butylene oxide, amylene oxide, epichlorohydrin and mixtures thereof. If desired, a portion of the polyhydric alcohol can be replaced with mononuclear diprimary-amines such as ethylene diamine and 1,6-hexane diamine as is well known in the art.

Other polyethers include those prepared by reacting a 1,2-alkylene oxide such as ethylene oxide, propylene oxide, butylene oxide or mixtures thereof with mononuclear polyhydroxy benzenes such as resorcinol, pyrogallol, phloroglucinol, hydroquinone, 4,6-di-t-butylcatechol, catechol, methylphloroglucinol, 2,5,6-trimethylresorcinol, 4-ethyl-5,6-dimethylresorcinol, n-hexylresorcinol, 4-chloro-5-methylresorcinol and the like. Still other polyethers can be prepared by reacting 1,2-alkylene oxides with polynuclear hydroxybenzenes such as various di-, tri- and tetraphenylol compounds in which two to four hydroxybenzene groups are attached by means of single bonds or by an aliphatic hydrocarbon radical containing 1 to 12 carbon atoms. Examples of diphenylol compounds include 2,2-bis(p-hydroxyphenyl)propane, bis(p-hydroxyphenyl)methane and the various diphenols and diphenylol methanes disclosed in U.S. Pat. No's 2,506,486 and 2,744,882.

Exemplary triphenylol compounds which can be employed include the alpha, alpha, omega, tri(hydroxyphenyl)alkanes such as 1,1,2-tris(hydroxyphenyl)ethane;
1,1,3-tris(hydroxyphenyl)-propane;
1,1,3-tris(hydroxy-3-methylphenyl)propane;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propane;
1,1,3-tris(hydroxy-2,6-dimethylphenyl)propane; 1,1,4-tris(hydroxyphenyl)butane; 1,1,4-tris(hydroxyphenyl)2-ethylbutane; 1,1,4-tris(dihydroxyphenyl)butane;
1,1,5-tris(hydroxyphenyl)-3-methylpentane;
1,1,8-tris(hydroxylphenyl)octane;
1,1,10-tris(hydroxylphenyl)decane and the like.

Tetrahydroxyphenyl compounds which can be reacted with 1,2-alkylene oxides include the alpha, alpha, omega, omega-tetrakis-(hydrophenyl)alkanes such as
1,1,2,2-tetrakis(hydroxylphenyl)ethane;
1,1,3,3-tetrakis(hydroxy-3-methylphenyl)propane;
1,1,4,4-tetrakis(hydroxyphenyl)butane;
1,1,4,4-tetrakis(hydroxyxphenyl)-2-ethylbutane;
1,1,5,5-tetrakis(hydroxyphenyl)pentane;
1,1,5,5-tetrakis(hydroxyphenyl)-3-methylpentane;
1,1,5,5-tetrakis(dihydroxyphenyl)pentane;
1,1,8,8-tetrakis(hydroxy-3-butylphenyl)octane;
1,1,8,8-tetrakis(hydroxy-2,5-dimethylphenyl)octane;
1,1,10,10-tretakis(hydroxyxlphenyl)decane; and the corresponding compounds which also contain hydroxyl groups in the hydrocarbon chain such as
1,1,6,6-tetrakis(hydroxphenyl)-2-hydroxyhexane;
1,1,6,6-tetrakis(hydroxyphenyl)-2-hydroxy-5-methylhexane;
1,1,7,7-tretakis(hydroxylphenyl)-3-hydroxylheptane and the like.

Other suitable polyethers include the 1,2-alkylene oxide derivatives of mononuclear primary amines such as o-, m- and p-phenylenediamine; 2,4- and 2,6-diaminotoluene; 2,6-diamino-p-xylene;
4,6-diamino-m-xylene; 2,4-diamino-m-xylene;
3,5-diamino-o-xylene; isohexyl-p-phenylenediamine;

3,5-diaminotoluene; methane-bis-o-chloraniline and the like; polynuclear and fused aromatic polyamines such as 1,4-naphthalenediamine; 1,5-naphthalenediamine; 1,8-naphthalenediamine; benzidine; toluidine; 4,4'-methylenedianiline; 3,3-dimethoxy-4,4'-biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 2,7-fluorenediamine; 1,4-anthradiamine; 3,3'-biphenyldiamine; 9,10-diaminophenanthrene and 4,4'-diaminoazobenzene.

The polyetherpolyols usable in this invention are liquids or meltable solids having molecular weights of from about 500 to about 5,000 and having functionalities of from about 1.5 to less than 3.0.

The polyols of the instant invention can be either capped with a polyisocyanate to form the prepolymer or reacted therewith in a one shot process. Polyisocyanates operable herein to form either prepolymers or reacted in a one shot process are of the formula R-(NCO)$_n$ wherein n is 2-4 and R is a polyvalent organic moiety having the valence of n. Suitable polyisocyanates include, but are not limited to, toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenlenediisocyanate, 4-ethoxy-1,3-phenylenediisocyanate, 2,4'-diisocyanatodiphenylether,5,6-dimethyl-1,3-phenylene-diisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'diisocyanatodibenzyl, 3,3'dimethyl-4,4'-diisocyanatodiphenylmethane, 2,6-dimethyl-4,4'-diisocyanatodiphenyl, 2,4-diisocyanato-stilbene, 3,3'-dimethyl-4,4'-diisocyanatodiphenyl, 3,3'-dimethoxy-4,4'-diisocyanatodiphenyl, 4,4'-methylene bis(diphenylisocyanate), 4,4'-methylene bis(dicyclohexylisocyanate), 1,4-anthracenediisocyanate, 2,5-fluorenediisocyanate, 1,8-naphthalenediisocyanate and 2,6-diisocyanatobenzfuran, PAPI (a polyaryl polyisocyanate commerical product sold by the Upjohn Company as defined in U.S. Pat. No. 2,683,730), 2,4,6-toluenetriisocyanate 4,4'4"-triphenylmethane triisocyanate and diphenylmethane tetraisocyanate. Also suitable are aliphatic polyisocyanates such as the triisocyanate Desmodur N-100 sold by Mobay which is a biuret adduct of hexamethylenediisocyanate; the diisocyanate Hylene W sold by DuPont, which is 4,4'-dicyclohexylmethane diisocyanate; the diisocyanate IPDI or isophorone diisocyanate sold by Thorson Chemical Corp., which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

It is to be understood that mixtures of two or more of these polyisocyanates can be employed. Aromatic isocyanates are preferred, particularly the toluene diisocyanates.

In the one shot method auxiliary blowing agents may be used to supplement the blowing action from the water reaction. Examples of useful blowing agents include halogenated hydrocarbons such as monofluorotrichloro methyane, dichlorodifluoromethane, 1,1,2-trichloro-1,2,2-trifluoroethane, sym-dichlorotetrafluoroethane, ethylene chloride, methylene chloride, chloroform and carbon tetrachloride. Other useful foaming agents include lower molecular weight alkanes, alkenes and ethers such as methane, ethane, ethylene, propane, propylene, pentane, hexane, heptane, diethyl ether, diisopropylether, mixtures thereof and the like. Generally, the halogenated hydrocarbon blowing agents are employed in an amount from about 1 to 50 parts by weight per 100 parts by weight of the polyol.

In the one shot polyurethane foaming reaction the organic isocyanate reacts with the polyol and water in the presence of fluorocarbons and catalysts. The polyol reacts with some of the isocyanate to form a chain-extended polyurethane, more of the isocyanate reacts with the water to form carbamic acid that breaks down to form a primary amine and carbon dioxide, the carbon dioxide and fluorocarbons expand the polyurethane into a cellular structure of foam, and the primary amine formed from the gas reaction reacts with further isocyanate to form a di-substituted urea which, in turn, reacts with more isocyanate to form crosslinking biuret and allophanate structures.

Generally, in the one shot process water is added in an amount ranging from a 10% deficiency up to a 10% excess of that required to react stoichiometrically with the remaining free NCO groups on the polyisocyanate after the polyisocyanate has been chain-extended by the polyol, i.e., 0.4 to 0.55 moles $H_2O$/mole NCO. The water is added to the formulation to help produce carbon-dioxide to develop foam structure. The water should be treated to remove impurities such as iron, calcium salts and other materials that produce hardness. Preferably, the water should be subjected to treatment with various zeolites and other molecular sieves or distilled to remove virtually all of the impurities.

A surfactant is added in the range of 0.1 to 5 parts to improve the cell structure and prevent collapsing of the foam during expansion of the blowing agent. Typical surfactants are the silicone oils and soaps and the siloxane oxyalkylene block copolymers such as those disclosed in U.S. Pat. No. 2,834,748.

Catalysts are added in amounts of from 0.1 to 5 parts per 100 parts of polyol to accelerate the different reactions. The chain-extension reaction, where the polyol reacts with the isocyanate to produce the polyurethane, is accelerated by tertiary amines, especially when they contain a tin cocatalyst. Examples of tertiary amines include triethylene diamine, tetramethyl butanediamine, triethylamine, n-methylmorpholine, N-ethylmorpholine, diethylethanolamine, N-comorpholine, 1-methyl-4-dimethylaminoethyl piperazine, N,N-dimethyl-N-(methylisopropylaminopropylene)amine, N,N-diethyl-3-diethylaminopropyl amine and dimethyl benzyl amine. Examples of tin cocatalysts include dibutyl tin dilaurate, stannous chloride, dibutyl tin-di-2-ethyl hexoate, stannous octoate, stannous oleate, tetramethyl tin, tetra-n-butyl tin, di-n-butyl tin dichloride, diisobutyl tin bis(-monobutyl maleate), di-n-butyl tin diacetate, di-2-ethylhexyl tin bis(2-ethyl hexoate), tri-n-butyl tin acetonate and dibutyl tin distearate.

In the prepolymer method set out in U.S. Pat. No. 4,137,200 referred to above and incorporated herein by reference, a catalyst is not necessary in the preferred embodiment although conventional catalysts, e.g., stannous octoate, can be used in the foaming reaction, if desired.

The polyisocyanate prepolymer is made from a polyether polyol which contains enough oxyethylene units to make the prepolymer hydrophilic.

Generally stated, the present crosslinked hydrophilic foam may be prepared using the prepolymer method by capping polyoxyethylene polyol with a polyisocyanate such that the capped product has a reaction functionality greater than two. The capped product is foamed simply by combining with an aqueous reactant. Optionally, the capped product and/or aqueous reactant may contain a suitable crosslinking agent, if desired, in which case the isocyanate-terminated polyoxyethylene polyol product may have a functionality approximating 2.

During capping, it is desirable that polyisocyanate be reacted with the polyol such that the reaction product, i.e., the isocyanate capped product, is substantially void of reactive hydroxy groups.

Polyoxyethylene polyol used as a reactant in preparing the capped product to be foamed may have a weight average molecular weight of about 200 to about 20,000 and preferably between about 600 to about 6,000, with a hydroxyl functionality of about 2 or greater, preferably from about 2 to about 8.

Polyoxyethylene polyol is terminated or capped by reaction with a polyisocyanate. The reaction may be carried out in an inert moisture-free atmosphere such as under a nitrogen blanket, at atmospheric pressure at a temperature in the range of from about 0° C. to about 120° C. for a period of time of up to about 20 hours depending upon the temperature and degree of agitation. This reaction may be effected also under atmospheric conditions provided the product is not exposed to excess moisture. The polyisocyanates used for capping the polyoxyethylene polyol are the same as those set out supra for the one shot method.

Capping of the polyoxyethylene polyol may be effected using stoichiometric amounts of reactants. Desirably, however, an excess of polyisocyanate is used to insure complete capping of the polyol. Thus, the ratio of isocyanate groups to the hydroxyl groups used for capping is between about 1 to about 4 isocyanate to hydroxyl.

Isocyanate-capped polyoxyethylene polyol reaction products (prepolymers) employed in the present invention may be exemplified as follows. First, when water is the sole reactant with the isocyanate groups leading to chain growth during the foaming process, the isocyanate-capped polyoxyethylene polyol reaction product must have an average isocyanate functionality greater than 2 and up to about 8 or more depending upon the composition of the polyol and capping agent components. Secondly, when the isocyanate-capped polyoxyethylene polyol has an isocyanate functionality of only about two, then the water or aqueous reactant used may contain a dissolved or dispersed isocyanate reactive crosslinking agent having an effective functionality greater than two. In this latter case, the reactive crosslinking agent is reacted with the isocyanate terminated polyoxyethylene polyol when admixed during and after the foaming process has been initiated. Thirdly, when the isocyanate-capped polyoxyethylene polyol has an isocyanate functionality of only about 2, then a polyisocyanate crosslinking agent having an isocyanate functionality greater than 2 may be incorporated therein, either preformed or formed in situ, and the resultant mixture may then be reacted with water or aqueous reactant, optionally containing a dissolved or dispersed isocyanate reactive crosslinking agent, leading to a crosslinked, infinite network, open cell, hydrophilic polyurethane foam.

Several different modes may be used to prepare the prepolymer, i.e., the hydrophilic, isocyanate terminated polyoxyethylene polyol reaction product having an average isocyanate functionality greater than 2. In forming the prepolymer, blends or mixture of the various polyols and/or polyisocyanates may be used as desired so long as the total average isocyanate functionality of the final urethane containing reaction product is greater than 2.

One possible method for preparing the prepolymer is by reacting polyoxyethylene glycol having a reactive functionality equal to 2 with a molar excess of a diisocyanate which leads to an isocyanate-capped polyurethane product (A) having an isocyanate functionality of 2. A polyol such as pentaerythritol having a reactive functionality equal to 4 is reacted with a large molar excess of a diisocyanate to form an isocyanate-capped polyurethane intermediate product (B) having an isocyanate functionality of 4. By blending the two isocyanate-capped products thus prepared, i.e., products (A) and (B), in various molar proportions, the resulting product mixture has an average isocyanate functionality greater than 2 and on treatment with aqueous reactants will lead to new improved hydrophilic, crosslinked, open cell, resilient polyurethane foams of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionality greater than 2.

A second method for preparing the prepolymer is to blend a generally linear diol with a polyol having at least 3 and preferably from 3 to 8 hydroxyl groups (e.g., trimethylol-propane, trimethylolethane, glycerol, pentaerythritol or sucrose). Generally, monomeric polyols having 3 to 4 hydroxyl groups per mole are employed. The blend is reacted with a sufficient amount of a polyisocyanate so that the resulting prepolymers are substantially void of unreacted hydroxyl groups, i.e., an excess of the polyisocyanate is preferably employed. The excess of polyisocyanate can range up to the point where about 4 isocyanate groups are employed for each hydroxyl group in the polyol blend. It is also preferable to carry out the capping reaction incrementally, i. e., the initial amount of polyisocyanate added to the blend is less than what is theoretically necessary to react with all the hydroxyl groups of the polyol blend. For example, about 95% of theory can be employed initially. After allowing the initial polyisocyanate to react, a subsequent addition of polyisocyanate can be made to bring the total amount employed equal to theory (i. e., stoichiometric as described above) or preferably an excess (e. g., about 105-115% of theory) can be employed.

It has also been found that the capped polyoxyethylene polyol having an isocyanate functionality greater than 2 used to prepare a three-dimensionally network polymer must be present in an amount sufficient to insure formation of the dimensional network. Amounts of the capped polyoxyethylene polyol having an isocyanate functionality greater than 2 in the component to be foamed range from about 3% by weight of this component up to 100% by weight. Thus, it is possible to include a capped polyoxyethylene polyol having a terminal member with an isocyanate functionality of 2, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate various amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40–60 mole percent, but desirably about 25–45 mole percent of the relatively hydrophobic comonomer, may be copolymerized with the ethylene oxide monomer and still yield hydrophilic crosslinked network foams when those products are used as polyol intermediates in practicing the present invention. Thus, throughout the text of this document, the term "polyoxyethylene polvol" is intended to include not only homopolymers of ethylene oxide but also hydrophilic copolymers of ethylene oxide such as those described above wherein all of these polyol derivatives have a hydroxyl functionality of about 2 or greater and an ethylene oxide content ranging from about 40 mole percent to about 100 mole percent and preferably greater than about 55 mole percent.

To effect foaming and preparation of the crosslinked network polymer, the prepolymer or resin reactant is simply combined with a particular aqueous component. For simplicity, this isocyanate-capped reaction component will occasionally be referred to herein as "resin reactant".

The aqueous component may be water, a water slurry or suspension, a water emulsion or a water solution having water soluble materials disposed therein. For convenience, the aqueous component is referred to herein as an aqueous reactant.

In contrast to typical polyurethane reactions such as those using catalyst or like promoters where one mole of —NCO is reacted with one half mole water, the reaction in U.S. Pat. No. 4,137,200 proceeds simply with a large but controlled excess of water.

In typical polyurethane reactions known to the art, it is known to employ an excess of water to obtain improved properties. This has been observed at page 43 in the publication by Saunders and Frisch entitled "Polyurethanes", published by Interscience Publishers, where it is further observed that, if less than stoichiometric amounts of water are used, the foam is more crosslinked, firmer, has lower elongation and higher density. A large excess of water, they observe, will use up the free isocyanate groups, leaving insufficient isocyanate available for effective crosslinking and resulting in the formation of many free amino end groups. As water content increases, the foam density decreases, and above 30–50% excess water results in a marked decrease in physical properties.

The dramatic way in which the addition of water influences the practice of the invention in U.S. Pat. No. 4,137,200 is seen by consideration of the Water Index:

$$\frac{\text{equivalents of } H_2O \times 100}{\text{equivalents of NCO}} = \text{Water Index Value}$$

Here one must keep in mind that in polyurethane foaming reactions one mole of water ultimately consumes two NCO groups, i.e., 1.0 mole $H_2O = 2$ equivalents —OH which react with 2 equivalents of NCO. A Water Index Value of 100 indicates the equivalents of water and equivalents of isocyanate are balanced. An Index of 95 indicates that there is a 5% shortage of water equivalents while an Index of 105 indicates a 5% surplus of water equivalents. A slight shortage of water equivalents (i. e., a slight excess of isocyanate), usually 3–5%, is common practice in the prior art, particularly with flexible foams.

In the prepolymer reaction in U.S. Pat. No. 4,137,200 the amount of water employed should exceed 6.5 moles $H_2O$ per mole of NCO groups ($H_2O$ Index Value of 1,300). The water employed can range up to 1,000 moles, preferably about 390 moles $H_2O$/mole NCO groups ($H_2O$ Index Value 78,000). Thus, the available water content in the aqueous reactant is at least 6.5 and can fall within a range from about 6.5 to about 390 moles $H_2O$ per mole of NCO groups, i.e., an $H_2O$ Index Value of about 1,300 to about 78,000 and desirably from about 4,000 to about 40,000, i. e., from about 20 to about 200 moles $H_2O$ per mole of NCO groups. "Available water" in the aqueous reactant is that water accessible for reaction with the prepolymer, and which is exclusive of water which may layer during reaction, or supplemental water which may be necessary because of further water-absorptive or water-binding components or additives present in and forming the aqueous reactant.

The reaction temperature to effect foaming obviously is regulated by the viscosity of the prepolymer. The reaction may proceed either as a batch reaction or as a continuous reaction. Either the prepolymer (resin reactant) may be poured into the aqueous reactant or both may be combined simultaneously such as when using spray or froth application techniques. Both internal metering/mixing spray equipment and external mixing spray equipment can be used as desired. Excessive agitation of the aqueous phase may tear the foam structure and should be avoided if an integral structure is desired.

The use of large molar excesses of water in the aqueous reactant leads to several important advantages and improvements over the conventional polyurethane foam compositions of the prior art. For example, in conventional polyurethane foam compositions the water concentration must be carefully controlled to near the theoretical amount usually an amount much less than about an $H_2O$ Index Value of 400 (2.0 moles H₂O/NCO groups in the polyurethane reaction components). This low concentration dictates the use of a catalyst to promote the rate of the polymerization foaming reaction and requires an intensive mixing step to achieve good mixing of reactants and catalyst so as to insure a controllable and uniform cellular product. In contrast, the prepolymer reaction in U.S. Pat. No. 4,137,200 requires a very large excess of water, e. g., typically an $H_2O$ Index Value in excess of about 1,300. Using this technique, the product quality and uniformity is not highly sensitive to accuracy of metering or mixing of the aqueous reactant, and the use of a polymerization catalyst or promoter is optional. Further, conventional polyurethane foam systems have limitations in spray-up thicknesses due to the fact that the high exotherm liberated during the foaming reaction tends to discolor the foams obtained, and foam thickness per single pass of the spray gun is limited to about 1 inch or less. In contrast, the compositions of U.S. Pat. No. 4,137,200 have excess amounts of water present as a diluent which moderates the polymerization exotherm, permits the spray-up of foam thicknesses per single pass of substantially greater than one inch, without discoloration or overheating of the foam product. Further, conventional foam production, processing and spraying equipment requires the frequent and extensive use of toxic or flammable organic solvents such as acetone, tricresyl phosphate, methylene chloride and the like for cleaning and purging purposes. With the hydrophilic polyurethane components of the present invention, cleaning may be carried out conveniently with simple, non-toxic and non-flammable aqueous solutions. Moreover, in conventional polyurethane foam systems, both parts of the two-part formulation are comprised primarily or organic compounds. In the method taught in U.S. Pat. No. 4,137,200, however, one of the two parts of the two-part formulations is primarily aqueous in nature, thereby facilitating metering and mixing, facilitating equipment clean-up, moderating reaction exotherm, reducing the fire hazard of the system during the spraying and other processing operations and permitting the use of very simple and low cost foam fabrication equipment.

Because large amounts of water may be in the aqueous reactant during reaction, i. e., the present invention is not dependent upon a stoichiometric molar NCO-water type reaction, it is possible to combine a great variety of materials in the aqueous reactant which are otherwise not possible with limited water reacting systems.

The aqueous reactant may be used at temperatures from slightly above 0° C. to about 100° C. as desired. It is possible also to effect reaction of the resin reactant using water vapor or steam as the aqueous component.

Large amounts of many water soluble or water dispersible materials may be added to the aqueous reactant utilized in U.S. Pat. No. 4,137,200. These materials may be added to the aqueous reactant up to about 800% by weight of the amount of water in the aqueous reactant depending, of course, on the particular material and its weight. Useful additives to the aqueous reactant include organic and inorganic salts, alcohols, amines, acids, polymer latices, resin or wax dispersions, flame retardants, fungicides, fillers, blowing agents, fibers, cellulosics, surfactants, boistats, pigments, dyes, zeolites, enzymes, proteins, chelates, hydrogenation or cracking catalysts, thickeners, stabilizers, promoters or the like. By homogeneously distributing these materials in the aqueous reactant, it is possible to effect wide distribution of these materials throughout the finally prepared foam. Some or all of the above additives may also be combined into the resin reactant if desired.

The term "epoxy resin" as utilized in the description of the curable foam composition of the present invention includes any monomeric, dimeric, oligomeric or polymeric epoxy material containing at least two epoxy functional groups. For example, those resins, which result from the reaction of bisphenol-A (4,4'-isopropylidenediphenol) and epichlorohydrin, or by the reaction of low molecular weight phenolformaldehyde resins (Novolak resins) with epichlorohydrin, can be used alone or in combination with an epoxy containing compound as a reactive diluent.

In addition, compounds can be extended to include polymeric materials containing terminal or pendant epoxy groups herein operable. Examples of these compounds are vinyl copolymers containing glycidyl acrylate or methacrylate as one of the comonomers. Other classes of epoxy containing polymers amenable to cure are epoxy siloxane resins, epoxy polyurethanes and epoxy polyesters. Such polymers usually have epoxy functional groups at the ends of their chains. Epoxy siloxane resins and method for making are more particularly shown by E. P. Plueddemann and G. Fanger, J. Am. Chem. Soc. 81 632–5 (1959). As described in the literature, epoxy resins can also be partially modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp. 209–271.

The curable compositions of the present invention can be made by blending the epoxy resin, which hereinafter will signify epoxy monomer, epoxy prepolymer, epoxy polymer or mixtures thereof, with the polyurethane prepolymer or the reactants of the one shot method. The foaming reaction does not effect the epoxy resin which is uniformly dispersed throughout the resilient, open cell foam.

The epoxy resins used herein can thereafter be cured by conventional means through the epoxy and hydroxyl groups of the resin. As is well known, two types of linkages are possible, i.e., (1) directly to other epoxy intermediate molecules with the aid of a catalyst; such catalysts are conventional and may be strong bases such as tertiary amines as set out in U.S. Pat. No. 2,444,333 or strongly acidic materials such as boron trifluoride; and (2) to a reactive hardener which combines with one or more additional molecules of resin. Primary and secondary amines such as triethylenetetramine, diethylenetriamine, m-phenylenediamine, ammonia, methylamine, ethylamine, propylamine are well known conventional hardeners. The resilient foam can be imbibed in an aqueous solution or organic solution of these amines for epoxy curing.

Epoxy curing agent as used herein includes both conventional catalysts and hardeners as set out in Handbook of Epoxy Resins, Lee & Neville, 5-1 to 31, McGraw Hill, Inc., 1967.

The catalyst used in the epoxy resin reaction is generally added in amounts ranging from 0.001 to 8.0 percent by weight of the epoxy resin. On the other hand, hardeners are usually added in amounts up to that sufficient to react stoichiometrically with the functional groups on the epoxy resin.

The amount of epoxy resin that can be added to the system can vary over wide limits depending upon the final properties desired. Thus, for a rigidized structure, amounts of epoxy resin ranging from 10% up to 200% by weight of either the polyisocyanate and polyol in the one shot method or the prepolymer in the prepolymer method can be employed. In the prepolymer method the epoxy resin can be added to either the prepolymer or the water, but preferably is added to the prepolymer.

The following examples will aid in understanding, but expressly not limit, the instant invention. Unless otherwise noted, all parts and percentages are by weight. For ease in explanation and for illustration purposes, the prepolymer method of forming a polyurethane foam will be exemplified. However, the one shot method of forming a foam is also operable herein, the only difference being that in the one shot method all the reactants are added simultaneously.

The rigidized foam product formed herein is useful for fluid filtering such as sewer treatment because of its ability to withstand compression and the concomitant decrease in porosity under the relatively high pressure of the fluid flow.

EXAMPLE 1

PREPARATION OF THE PREPOLYMER

A prepolymer was prepared by admixing two molar equivalents of polyethylene glycol having an average molecular weight of 1,000 (PEG-1,000) and one molar equivalent of trimethylolpropane. (TMOP). The admixture was dried at 100°–110° C. under a pressure of 5–15 Torr to remove water. The resulting dried mixture was slowly added over a period of about 1 hour to a vessel containing 6.65 molar equivalents toluene diisocyanate (TDI) while stirring the TDI and polyol mixture. The temperature was maintained at 60° C. with stirring for 3 additional hours. Then an additional 1.05 molar equivalent of TDI was added with stirring over a period of about 1 hour while maintaining the temperature at 60° C. The final reaction mixture contained a 10% molar excess of TDI. All hydroxyl groups were capped with isocyanate and some chain-extension occurred between the polyol and the TDI. The prepolymer formed herein will hereinafter be referred to as Prepolymer A.

EXAMPLE 2

50 parts of Prepolymer A from Example 1 were admixed with 50 parts of a commercially available epichlorohydrin/bisphenol A type low molecular weight epoxy resin sold under the tradename Epon-828 by Shell Chemical Co. A volume of water equal to that of Prepolymer A and the epoxy resin, said water containing 2.5 parts by weight of a polyoxyethylene stearyl ether surfactant, sold under the tradename Brij-72 by Atlas Chemical Industries were admixed with the prepolymer and epoxy resin with high agitation and then passed into a container wherein a foam material was obtained within 4 minutes. The foam produced was dried in an oven for 4 hours and then cut into 1 inch slabs which had a density of 13 pounds per cubic foot. The thus formed slabs were flexible and could be bent into practically any configuration. The flexible slabs were placed in a container containing concentrated $NH_4OH$ on the bottom of the container. The ammonia vapors permeated the foam sample and after overnight standing at room temperature the foam became rigid and rock-hard.

EXAMPLE 3

Example 2 was repeated except that 20 parts of Epon-828 were admixed with 80 parts of Prepolymer A. The flexible foam produced therefrom had a density of 6.7 pounds per cubic foot. Upon ammonia treatment as in Example 2 the sample became harder but still retained some resiliency.

The epoxy containing rigidized urethane foams of the instant invention can also be used as sound barriers such as in walls and ceilings. The following examples will show that the epoxy cured rigidized urethane foams have substantially the same sound barrier properties as the flexible urethane foams containing the uncured epoxy material.

EXAMPLE 4

50 parts of Prepolymer A from Example 1 were admixed with 50 parts of a commercially available epichlorohydrin/bisphenol A type low molecular weight epoxy resin sold under the tradename Epon-828 by Shell Chemical Co. A volume of water equal to that of Prepolymer A and the epoxy resin, said water containing 2.5 parts by weight of a polyoxyethylene stearyl ether surfactant, sold under the tradename Brij-72 by Atlas Chemical Industries were admixed with the prepolymer and epoxy resin with high agitation and then passed into a container wherein a foam material was obtained within 4 minutes. The foam produced was dried in an oven for 4 hours and then cut into 1 inch slabs. One half of the thus formed flexible foams were placed in a container containing concentrated $NH_4OH$ on the bottom of the container. The ammonia vapors permeated the foam samples, and after overnight standing at room temperature the foam sample became rigid and rocklike due to the curing of the epoxy resin.

The 1" thick epoxy containing urethane foam samples (both cured and uncured) were tested for sound absorption in accord with ASTM C384-77 on a Bruel & Kjaer Standing Wave Apparatus Type 4002 in combination with a Beat Frequency Oscillator Type 1002 and Frequency Analyzer Type 2107. The results are shown in TABLE I at various frequencies:

TABLE I

| Example No. | Foam | Density g/cc | % Sound Absorption ||||| 
|---|---|---|---|---|---|---|---|
| | | | 250Hz | 500Hz | 1KHz | 2KHz | 4KHz |
| 4a | Flexible Urethane containing uncured epoxy resin | 15.3 | 20 | 40 | 42 | 53 | 68 |
| 4b | Rigidized Urethane containing cured epoxy | 15.3 | 18 | 32 | 38 | 62 | 70 |

TABLE I-continued

| Example No. | Foam resin | Density g/cc | % Sound Absorption | | | | |
|---|---|---|---|---|---|---|---|
| | | | 250Hz | 500Hz | 1KHz | 2KHz | 4KHz |

As can be seen from the results in TABLE I, the % sound absorption of the epoxy cured rigidized urethane foams is substantially the same as for the flexible urethane foams containing uncured epoxy resin.

The following examples shows the ability of the flexible foam to be shaped prior to being rigidized by curing the epoxy resin:

EXAMPLE 5

50 parts of Prepolymer A from Example 1 were admixed with 50 parts of a commercially available epichlorohydrin/bisphenol A type low molecular weight epoxy resin sold under the tradename Epon-828 by Shell Chemical Co. A volume of water equal to that of Prepolymer A and the epoxy resin, said water containing 2.5 parts by weight of a polyoxyethylene stearyl ether surfactant, sold under the tradename Brij-72 by Atlas Chemical Industries were admixed with the prepolymer and epoxy resin with high agitation and then passed into a container wherein a foam material was obtained within 4 minutes. The foam produced was dried in an oven for 4 hours and then cut into 1 inch thick slabs which had a density of 13 pounds per cubic foot. The thus formed slabs were flexible. The thus formed flexible foam slabs were pressed from a 2 inch thickness to a 1 inch thickness and in their pressed condition were placed in a container containing concentrated NH$_4$OH on the bottom of the container. The ammonia vapors permeated the pressed foam sample and after overnight standing at room temperature the foam became rigid. Upon release of the pressure the foam remained in its 1 inch thickness.

EXAMPLE 6

50 parts of Prepolymer A from Example 1 were admixed with 50 parts of a commercially available epichorohydrin/bisphenol A type low molecular weight epoxy resin sold under the tradename Epon-828 by Shell Chemical Co. A volume of water equal to that of Prepolymer A and the epoxy resin, said water containing 2.5 parts by weight of a polyoxyethylene stearyl ether surfactant, sold under the tradename Brij-72 by Atlas Chemical Industries were admixed with the prepolymer and epoxy resin with high agitation and then passed into a container wherein a foam material was obtained within 4 minutes. The foam produced was dried in an oven for 4 hours and then cut into 2 inch thick slabs which had a density of 13 pounds per cubic foot. The thus formed flexible foam slabs were rolled around a ½" dia. dowel and in their rolled condition were placed in a container containing concentrated NH$_4$OH on the bottom of the container. The ammonia vapors permeated the rolled foam sample and after overnight standing at room temperature the foam became rigid. Upon release of the pressure the foam remained in its rolled configuration.

EXAMPLE 7

50 parts of Prepolymer A from Example 1 were admixed with 50 parts of a commercially available epichlorohydrin/bisphenol A type low molecular weight epoxy resin sold under the tradename Epon-828 by Shell Chemical Co. A volume of water equal to that of Prepolymer A and the epoxy resin, said water containing 2.5 parts by weight of a polyoxyethylene stearyl ether surfactant, sold under the tradename Brij-72 by Atlas Chemical Industries and 10 parts benzyldimethylamine were admixed with the prepolymer and epoxy resin with high agitation and then passed into a container wherein a foam material was obtained within 1 minute. The flexible foam produced was immediately dried in an oven for 10 hours at 60° C. A rigidized foam resulted.

EXAMPLE 8

Example 7 was repeated except that the drying of the flexible foam was carried out in two stages, i. e., the first one hour at 60° C. followed by a one hour drying at 90° C. A rigidized foam resulted.

I claim:
1. A method for preparing rigidized polyurethane foams comprising admixing
   A. a member of the group consisting of
      (1) a urethane-containing prepolymer having polyether or polyester backbone segments end-capped with an aromatic isocyanate and
      (2) an aromatic polyisocyanate and a polyol selected from the group consisting of polyethers and polyesters;
   B. about 0.4 to 1,000 moles of water for each mole of NCO; and
   C. 10 to 200% by weight of said group member A of an epoxy resin,
to form a flexible foam and thereafter treating with an epoxy curing agent to rigidize the flexible foam.
2. The method according to claim 1 wherein the flexible foam is reshaped prior to being rigidized.
3. The method according to claim 1 wherein the epoxy curing agent is ammonia vapor.
4. A method for preparing rigidized polyurethane foam comprising admixing
   A. isocyanate capped prepolymers consisting of a mixture of
      (1) an isocyanate capped hydrophilic polyoxyethylene diol, said diol having an ethylene oxide content of at least 40 mole percent; and
      (2) an isocyanate capped polyol having a hydroxyl functionality in the range 3 to 8 prior to capping; said isocyanate capped polyol being present in an amount in the range 2.9 to 50% by weight of (1) and (2);
   B. 0 to 15% excess of the theoretical amount necessary to react with the diol and polyol in A of an aromatic polyisocyanate having an isocyanate functionality in the range 2.0 to 3.0;
   C. 6.5 to 390 moles of water for each mole of unreacted isocyanate; and
   D. 10 to 200% by weight of A and B of an epoxy resin, to form a flexible foam and thereafter treating with an epoxy curing agent to rigidize the flexible foam.
5. The method according to claim 4 wherein the flexible foam is reshaped prior to being rigidized.
6. The method according to claim 4 wherein the epoxy curing agent is ammonia vapor.

* * * * *